Dec. 17, 1957     K. REINER     2,816,591
LIGHT WEIGHT METAL LOCK NUT HAVING A RELATIVELY HARD, THIN
AND RESILIENT LOCKING SLEEVE PORTION
Original Filed June 16, 1952
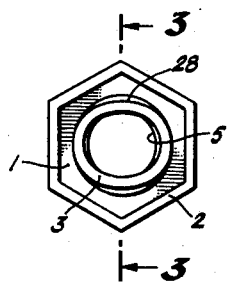
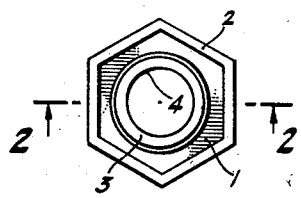
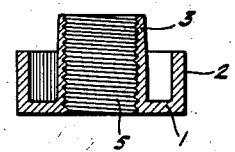
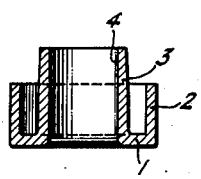
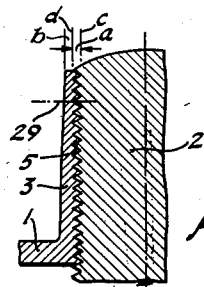
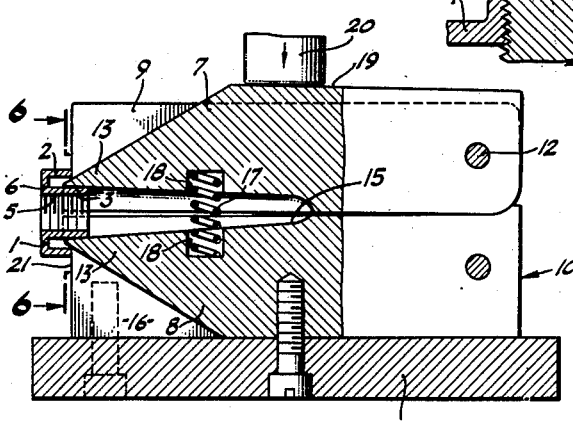
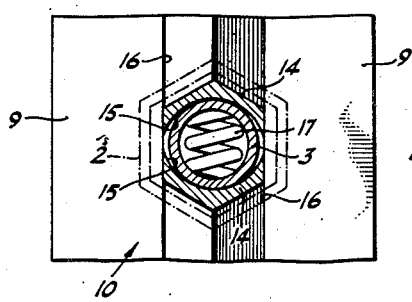
INVENTOR.
KENNETH REINER
BY
ATTORNEYS United States Patent Office 2,816,591
Patented Dec. 17, 1957

2,816,591

LIGHT WEIGHT METAL LOCK NUT HAVING A RELATIVELY HARD, THIN AND RESILIENT LOCKING SLEEVE PORTION

Kenneth Reiner, Los Angeles, Calif.

Continuation of application Serial No. 293,765, June 16, 1952. This application March 1, 1957, Serial No. 643,210

4 Claims. (Cl. 151—21)

This invention relates to self-locking threaded fasteners commonly known as "lock nuts" or "check nuts." More particularly the invention relates to such fasteners in usages wherein light weight and high strength are particularly advantageous, as for example, in common aircraft constructions. This application is a continuation of applicant's prior and co-pending application, Serial No. 293,765, filed in the United States Patent Office on June 16, 1952, now abandoned.

Prior to this invention it has not been feasible to economically produce a one-piece all-metal self-locking fastening device having combined characteristics of light weight, small bulk, and substantial strength to any degree satisfactory for general aircraft usage. This was due to the fact that prior known structurally satisfactory types of all-metal lock nuts had severe limitations in view of the fact that their self-locking portions lacked sufficient resilience to allow uniform self-locking torque characteristics or permit sufficient reuse, and, along with excessive bulk and weight, they had numerous operating features which were inconsistent with the rigid requirements of general aircraft usage.

The present invention is based upon structures and techniques which make it possible to construct one-piece all-metal light-weight self-locking nuts of high strength and relatively slight bulk which are eminently satisfactory for general aircraft use.

The lock nuts of this invention are predicated on utilization of structures having exceptionally thin threaded portions of especially high hardness values, so as to be extremely resilient and to produce unusually effective self-locking actions, yet which are exceptionally strong and resistive to loads applied by highly-stressed mating bolts. Thus they possess properties capable of developing the full strengths, without impairing the structural properties of the bolt members, as would normally occur if nut structures of equally high hardnesses and of prior art designs were used with the said same bolt members.

Specifically, it has been discovered that if nuts are made in accordance with the teachings of this invention they may be made to hardnesses exceeding those generally considered feasible in the prior art, and nuts of the preferred embodiment of the present invention are heat-treated to hardness ranges as high as 45–50 Rockwell "C" when made of plain carbon steel.

In lock nuts of the class disclosed, the thickness at the outermost end portion of the threaded sleeve is of extreme importance and is a controlling factor in affecting the desired resilience and self-locking characteristics of the nut. For any given desired quality of resilience, of course, the sleeve thickness, material strength, and depth of thread are related functions. It is an important feature of this invention, and a radical departure from known prior structures and procedures, that the material be hardened, as for example, by heat treatment, to hardness ranges exceeding 32 Rockwell "C" and that the minimum wall thicknesses of the nuts be less than twice the distance between the crest and the root apex or vertex of a standard V thread for the particular nut size, thereby providing constructions of great strength, high locking resilience, and minimum weight.

Accordingly, the maximum sleeve wall thickness at its smallest portion prior to threading, may be easily computed by using the known nominal pitch of the thread for any given nut size. It is an established fact that the nominal distance between the crest and the root apex of any given thread form is available in standard handbooks. As an example, for a 60° V thread which is, of course, the type universally used throughout industry, the said distance is 0.64952 x the pitch of the thread. Therefore, for a #10–32 size nut with a 60° V thread therein the maximum wall thickness at the smallest portion must, according to this invention, be less than 2 x 0.64952 x 1/32 or something under .0406 inch.

It is an established fact that the resilience of a member in bending varies inversely as the square of its thickness, and directly as its hardness. The exceptional thinness of the locking portion of the nut of the present invention, coupled with its exceptional hardness, both as described above, results in greatly augmented qualities of elasticity providing a lock-nut construction which is extremely satisfactory in resisting any tendency to loosen in response to vibration or to other forces tending to unscrew it, and which has an exceptional ability to return to its noncircular shape upon repeated insertions and withdrawals of a bolt therefrom.

It is, therefore, an object of this invention to provide novel all-metal lock-nut constructions having such combined properties of lighter weight, smaller bulk, and greater self-locking reusability than previously known lock nuts as to particularly qualify them for broad general use in aircraft applications.

A further object of this invention is to produce a nut of the general type discussed which includes a sleeve having an exceptionally hard and thin light-weight wall and which is of axial strength equal to conventional "thick-wall" nuts.

Another object of this invention is to provide an exceptionally hard nut which can be made by economical mass production techniques by virtue of the fact that the materials used are initially of relatively low strength and may be retained in this condition throughout the preliminary fabrication steps utilized in forming them.

A still further object of this invention is to provide an all-metal lock nut which has improved qualities of resistance to forces tending to loosen its connection to a mating bolt when subjected to continuous vibration, and in which its check-nut effect is inherent in the characteristics of the threaded nut wall and is independent of whether or not the nut is screwed up with great force upon its seat. Such nuts are known in the art as "pre-veiling torque" type nuts.

Another object of this invention is to provide novel lock-nut constructions of substantial hardness and strength and yet of such resilience that the mating bolts used therewith are not damaged.

These and other objects and advantages of the invention will be readily apparent from the following detailed description, taken in conjunction with the appended drawing, wherein:

Figure 1 is a top-plan view of a nut blank which may be used in practicing the present invention.

Figure 2 is a vertical sectional view through the nut blank of Figure 1, taken along the line 2—2 of Figure 1.

Figure 3 is a view similar to Figure 2, showing the blank after threads have been cut therein.

Figure 4 is an enlarged fragmentary sectional view schematically illustrating the engagement of a proper threaded member, as a bolt, with the threaded sleeve of a completed lock nut according to this invention.

Figure 5 is a longitudinal sectional view through a pair of dies which may be used to deform the threaded sleeve of the nut blank shown in Figure 3 to transform said nut into a check nut, portions of the die construction being broken away for ease of illustration.

Figure 6 is a vertical sectional view taken along the line 6—6 of Figure 5 and particularly illustrating the sectional form of the deforming dies relative to the outline of a nut blank in the process of being deformed thereby.

Figure 7 is a top-plan view of a completed check nut according to this invention.

In practicing this invention I employ a blank which usually has a transverse flange or disc-form plate disposed substantially at right angles to the axis of a sleeve member as best shown in the drawing in Figures 1 and 2, and said disc, if desired, may have its outer edges of a particular desired torque-receiving configuration, which may be in the form of an upturned hexagon as shown. The type of torque receiving configuration is not an essential part of this invention and is shown for purposes of illustration only, since any type is within the scope of this disclosure, as for example, a flat surface adaptable for riveting to a structural member.

The nut blank, as used in the practice of this invention, may be selected of materials in their optimum state of formability or machinability, provided such materials are of a type which can be strengthened and hardened to a desired degree by a subsequent process such as heat treatment. Examples of materials capable of having suitable qualities before and after such a process are carbon steels, beryllium-copper alloys, and some stainless steels. Of course, other soft, ductile materials capable of being hardened and strengthened to a desired degree by subsequent treatment may also be used.

Thus, as stated above, a blank of the general form shown in Figures 1 and 2 and made of a relatively soft material, as for example, annealed heat-treatable carbon steel, may be used. For the example illustrated in the drawings, see Figure 4. The blank must be formed, at its outermost edge, of a wall thickness of less than twice the distance between the crest and the root apex or vertex of the thread to be as applied to the nut size involved, and this maximum thickness may be readily ascertained by simple computations as previously outlined.

The sleeve member 3 may be tapered slightly as shown, this being a preferred construction since it takes advantage of the normal thread loading characteristic of nut-bolt combinations (i. e., the fact that the loads are greater at the base of the nut and progressively decrease to the tip).

Referring now more particularly to the drawing, wherein like reference numerals have been appended to like parts in all of the various figures and wherein are shown illustrative examples of a lock nut according to this invention and of means for performing the thread deforming step of the manufacturing technique disclosed herein, attention is directed to Figures 1 and 2, which show a nut blank as previously described. The nut blank comprises a disc-form plate or flange 1, the marginal portion of which is disposed at right angles to its plane to form a hexagonal torque applying wall 2, and includes a sleeve 3 which is of substantially cylindrical or possibly tapered external form with a cylindrical bore 4 extending through it as shown.

The blank, as described, is then tapped or cut to form a continuous thread 5 on the inner wall of the sleeve 3. This thread is generally of 60° V-form section, as best shown schematically in Figure 4, wherein the depth of the thread is indicated by "*a*" between the lines "*c*" and "*d*," which are on lines including the crests and the root apexes of the threads respectively, and the depth of the remaining portion of the sleeve wall is designated by "*b*," to indicate the relative depth of the cut.

After the threading operation, the unfinished lock nut is placed in die apparatus of the type shown in Figures 5 and 6. The apparatus comprises two die elements 7 and 8 mounted between two side walls 9 of a press 10. While both of these dies could be moved to deform the tip portion of the nut 6, the illustrated apparatus is one in which the lower die 8 is held in a fixed position, by being bolted to the bottom 11 of the press, as shown. The upper die is movable about a transverse bolt or shaft 12 at the rear of the press. The forward ends of the dies 7 and 8 have tapered noses 13 and present inclined upper and lower faces 14 which conform to the shape of the apron 2. In the illustrated configuration, since the apron is hexagonal, the faces 14 have 60 degree angles formed in adjacent surfaces thereof, as best seen in Figure 6, and are tapered as shown in Figure 5 to allow the die ends to be extended over the sleeve 3 for some distance beyond the open end of the apron 2 to assist the operator in positioning nut blanks in the press. The inner face of each die is finished to the semi-cylindrical form of a radius which is slightly greater than the radius of the outer wall of the sleeve 3, as shown at 15 (Figure 6), and is very slightly tapered to a largest diameter at its tip end. In Figure 6 the relation of these arcs or curves is exaggerated in order to make the same more apparent. The faces 15 extend a considerable distance back towards the rear of the dies and are provided with opposed sockets 18 in which a coil spring 17 is housed, as shown. Spring 17 exerts a force to bias the top face 19 of the movable upper die 7 against a stop member or against an operator-controlled plunger 20, as shown.

In using the press, the operator sets a threaded nut blank in place with the sleeve 3 projecting into the space between the two dies 7 and 8 (held normally spaced from one another by the spring 17), and with the inner end of the hexagonal apron seated against the press. The nut is then oriented so that its angular walls are disposed relative to the outer surfaces of the die members in the manner indicated in dotted lines in Figure 6, that is, with side walls of the apron parallel with the side faces 16 of the space in which the dies are located. When pressure is applied to operate the plunger 20, the movable die 7 is depressed towards the fixed die 8. Because the radius 15 of each of the dies is greater than the radius of the outer face of the sleeve wall, the wall is deformed to assume the elliptical shape shown in Figure 7. In this configuration the extreme end portion of the sleeve 3 remote from the flange 1 is substantially in the shape of an ellipse which has a major diameter which is greater than the diameter of the circular opening in the base of the sleeve at the plane of the flange, and a minor diameter which is less than the diameter of said circular opening. The surface defined by the pitch line of the threads has the same shape in any one plane as the cross section of the sleeve at that plane, since the threads are cut before the deformation of the sleeve and are deformed therewith. Thus, the sleeve has no abrupt discontinuities nor sharp edges but rather changes shape gradually from the circular shape at the base or flange end to the maximum out-of-round portion at the tip. In any one plane normal to the axis, the wall thickness of the sleeve, excluding the threads, is constant.

By reason of the fact that the starting blank is of material having low elastic limit and low resilience properties to start with, it follows that, after being deformed, the deformation will persist. That is, the deformed blank will be substantially incapable of resuming its original circular shape as would be true of a material with high resilience and high elastic limit. The soft threaded and deformed blank is then treated, as by heat-treatment, to raise its elastic limit and resilience. This, of course, hardens the material of the nut giving it greater strength and resilience to a desired degree, the deformed portion of the sleeve thus being "set" in its elliptical shape and having, therefore, an exceptional ability to return to this elliptical shape thereby performing a locking function upon insertion of a round body such as a threaded bolt therein. This same ability, of course, renders such lock nuts capable of extensive reuse.

According to this invention, the degree of treatment is such as to produce high strength, hardness and resilience in the finished lock nuts. This varies, of course, with the nature of the nut material used and is related to the nature and hardness of the material and the strength and function of the desired matching bolt it is designed for use with. In normal aircraft usages, in accordance with the preferred embodiment of the present invention wherein the nut is designed for use with standard aircraft bolts, it is preferable to harden the lock nuts to a range of 45 to 50 Rockwell "C." Such hardnesses were previously considered impractical for standard uses by prior art designers because experience predicated on prior known nut structures available before this invention indicated that such structures would produce premature fatigue failures of the mating bolts.

The construction of the lock nut of the present invention avoids this prior objection by reason of the relative thinness of the threaded sleeve which allows a degree of resilience both axially and radially. Thus, referring to Figure 4, showing a bolt inserted in position in a lock-nut sleeve, the relative wall thickness may be seen at the line 29. In connection with this line 29, one can consider it as one point, or element, of a helical zone or line extending continuously around the wall of the sleeve, throughout the entire slope of the helix forming the thread of the sleeve. This narrow helical zone of resilient metal permits (by virtue of its thinness and hardness) both axial and radial deflection of the grooves in the sleeve to enable them to adapt to the threads of the bolt.

With respect to the elliptical locking portion, because the operating faces of the dies incline somewhat to the axis of the sleeve, the deformation of the sleeve is gradual in an outward direction toward the tip of the sleeve where such deformation is a maximum. This gradual change in section is most desirable in that a gradual build-up of thread engagement and torque are effected upon insertion of a bolt in the lock nut.

From the above it should be obvious that the present invention provides novel lock-nut structures having improved combined qualities of high strength, resilience, reusable locking capacity, light weight, and minimum bulk. These qualities are imparted by the novel design and manufacturing techniques described in this specification. As a result, therefore, lock nuts produced according to this invention, by virtue of their greater hardness, thinness, and resilience, are stronger (more resistant to failure in shear or hoop tension) and less likely to loosen under vibration than prior known lock nuts.

While the invention has been described in detail with specific examples of structure and procedure, such examples are intended as illustrative rather than as limiting since various changes in structure and procedure are obviously within the scope of the present disclosure. For example, I have illustrated and described the deformation of the sleeve end and of the means for effecting it as related to an elliptical configuration formed by a pair of opposed pressure points. (It should be understood that this illustrative disclosure is not intended to be limiting but is rather only by way of example of a preferred embodiment.) Obviously many shapes of deformation and many means for effecting such shapes may be used. Thus, the sleeve may be displaced at a single point or line on the periphery of its wall; it may be forced inwardly at two diametrically opposite points (as in the illustrative example) or it may be pushed inwardly at a greater number of points around the periphery of the sleeve. Accordingly, it is to be understood that the scope of the present invention is not to be limited to the specific illustrative disclosure but rather by the scope and language of the appended claims.

I claim:

1. A one-piece, all-metal prevailing torque type self-locking nut fabricated of easily machinable material of relatively low hardness value but which material is responsive to treatment to raise its tensile strength and hardness, comprising an internally threaded imperforate sleeve having a flange at one end thereof, the sleeve being of circular cross-section adjacent the flange end thereof and of non-circular cross-section at the other end thereof, a significant length of said sleeve starting at said non-circular end being of such thickness between its outer periphery and the crest of the thread as to be less than twice the depth of the thread as measured between its crest and root apex, said nut having a hardness value exceeding 32 Rockwell "C."

2. A one-piece, all-metal prevailing torque type self-locking nut fabricated of easily machinable material of relatively low hardness value but which material is responsive to thermal treatment to raise its tensile strength and hardness, comprising an internally threaded imperforate sleeve having a flange at one end thereof, the sleeve being of circular cross-section adjacent the flange end and of non-circular cross-section at the other end, a significant length of said sleeve starting at said non-circular end being of such thickness between its outer periphery and the crest of the thread as to be less than twice the depth of the thread as measured between its crest and root apex, said nut being of a hardness in the range of 45–50 Rockwell "C."

3. A nut comprising a sleeve having continuous threads therein, the central opening within the threads being substantially circular adjacent one end of the sleeve and being non-circular adjacent the other end of the sleeve, a member formed integrally with the sleeve at the circular end thereof and being capable of transmitting torque, the wall thickness of the sleeve tapering gradually in an axial direction and having a minimum value at said other end of the sleeve, said wall thickness of the sleeve excluding the threads being nominally substantially constant in any one plane normal to the sleeve axis, a significant length of said sleeve adjacent said other end of the sleeve having a wall thickness between its outer periphery and the crest of the thread which is less than twice the depth of the thread as measured from the crest to the root apex thereof, the sleeve gradually changing and smoothly merging axially between its ends without sharp discontinuities nor abrupt cross-section variations, the nut having a hardness value in the range of 45 to 50 Rockwell "C," the tapered non-circular portion of the sleeve having a thinness and elasticity such that after being deflected toward a rounded condition by a mating bolt it will recover substantially to its initial shape upon the bolt being withdrawn.

4. A one-piece, all metal prevailing torque type self-locking nut fabricated of easily machinable material of relatively low hardness value but which material is responsive to thermal treatment to raise its tensile strength and hardness, comprising an internally threaded imperforate sleeve having a flange at one end thereof, said sleeve having an external taper in an axial direction to provide a construction which is thickest at the flange end and thinnest at the other end thereof, the sleeve being of circular cross-section adjacent the flange end and of non-circular cross-section at the said other end, a significant length of said sleeve adjacent the thinnest portion at the said other end being of such thickness between its outer periphery and the crest of the thread as to be less than twice the depth of the thread as measured between its crest and root apex, said nut being of a hardness in the range of 45–50 Rockwell "C."

(References on following page)

References Cited in the file of this patent

UNITED STATES PATENTS

| | | |
|---|---|---|
| 1,320,503 | Smith | Nov. 4, 1919 |
| 1,873,895 | Kimbell | Aug. 23, 1932 |
| 2,150,852 | Tinnerman | Mar. 14, 1939 |
| 2,265,661 | Luce | Dec. 9, 1941 |
| 2,287,691 | Marchou | June 23, 1942 |
| 2,385,991 | Huntoon | Oct. 2, 1945 |
| 2,441,580 | Mageoch | May 18, 1948 |
| 2,581,312 | Tinnerman | Jan. 1, 1952 |

OTHER REFERENCES

Mechanical Engineering's Handbook, fourth edition, Lionel S. Marks.